(12) United States Patent
Allen

(10) Patent No.: US 12,596,045 B2
(45) Date of Patent: Apr. 7, 2026

(54) PRESSURE SENSOR AND PRESSURE RELIEF VALVE TESTING

(71) Applicant: Hycontrol Limited, Worcestershire (GB)

(72) Inventor: Nigel Allen, Worcestershire (GB)

(73) Assignee: Hycontrol Limited, Worcestershire (GB)

( * ) Notice: Subject to any disclaimer, the term of this patent is extended or adjusted under 35 U.S.C. 154(b) by 337 days.

(21) Appl. No.: 18/268,403

(22) PCT Filed: Dec. 7, 2021

(86) PCT No.: PCT/GB2021/053193
§ 371 (c)(1),
(2) Date: Jun. 20, 2023

(87) PCT Pub. No.: WO2022/136828
PCT Pub. Date: Jun. 30, 2022

(65) Prior Publication Data
US 2024/0035914 A1     Feb. 1, 2024

(30) Foreign Application Priority Data
Dec. 22, 2020     (GB) ..................................... 2020376

(51) Int. Cl.
*G01L 27/00*          (2006.01)
*G05D 16/20*          (2006.01)
(52) U.S. Cl.
CPC .......... *G01L 27/00* (2013.01); *G05D 16/2013* (2013.01)
(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS

| | | | | |
|---|---|---|---|---|
| 10,408,496 | B2 * | 9/2019 | Lopez | ..................... F16K 17/38 |
| 11,046,510 | B2 * | 6/2021 | König | ..................... G08C 17/02 |

(Continued)

FOREIGN PATENT DOCUMENTS

| | | |
|---|---|---|
| CN | 109373039 A | 2/2019 |
| CN | 209100716 U | 7/2019 |

(Continued)

OTHER PUBLICATIONS

PCT International Search Report, Dec. 7, 2021.
(Continued)

*Primary Examiner* — Andre J Allen
(74) *Attorney, Agent, or Firm* — Boyle Fredrickson, S.C.

(57)     ABSTRACT

A pressure sensor assembly (19) for remote testing of a pressure sensor (15) adapted to monitor the air pressure developed in an interior (21) of a container (1), the pressure sensor assembly (19) comprising: an enclosed chamber having (25): a first opening (31) arranged to communicate with the interior of the container (1); and a second opening (33) arranged to communicate with the pressure sensor (15) for monitoring air pressure developed in the interior (21) of the container (1); wherein the chamber (25) defines a channel for transmission of pressure between the first opening (31) and the second opening (33) and wherein a constriction (55) is formed in the channel, the pressure sensor assembly (19) further comprising: an air injection system (45) adapted to inject a test pulse (47) of air into the enclosed chamber (25), between the constriction (55) and the second opening (33), wherein the constriction (55) is configured to create a back pressure in the enclosed chamber (25) in response to the test pulse of air (47), and functional operability of the pressure sensor (15) is verified based on the pressure measured in response to the test pulse of air (47).

12 Claims, 4 Drawing Sheets

(58) Field of Classification Search
CPC ............... G01L 19/0007; G01L 9/0042; G01L
19/0038; G01L 9/0073; G01L 9/0075;
G01L 9/0054; G01L 9/0055; G01L 19/04;
G01L 7/00; G01L 7/04; G01L 19/148;
G01L 19/14; G01L 19/143; G01L 17/00;
G01L 7/18; G01L 19/0092; G01L 15/00;
G01L 9/0051; G01L 7/041; G01L 9/12;
G01L 9/065; G01L 19/0618; G01L
9/0052; G01L 9/125; G01L 7/16; G01L
19/0609; G01L 19/003; G01L 9/007;
G01L 19/0627; G01L 19/0046; G01L
9/0022; G01L 9/06; G01L 19/0636; G01L
7/084; G01L 13/02; G01L 19/0023; G01L
19/142; G01L 7/043; G01L 19/08; G01L
9/0002; G01L 19/02; G01L 9/008; G01L
19/141; G01L 9/006; G01L 11/02; G01L
19/0672; G01L 23/10; G01L 23/18; G01L
19/0681; G01L 9/0077; G01L 19/12;
G01L 27/005; G01L 7/082; G01L 9/0044;
G01L 19/0015; G01L 19/0069; G01L
7/063; G01L 9/0001; G01L 19/146; G01L
21/12; G01L 27/002; G01L 27/007; G01L
9/16; G01L 11/00; G01L 19/00; G01L
9/0026; G01L 9/0089; G01L 9/045; G01L
9/14; G01L 19/0654; G01L 1/2281; G01L
11/025; G01L 13/026; G01L 11/008;
G01L 7/22; G01L 13/00; G01L 9/0047;
G01L 7/08; G01L 9/0076; G01L 9/0025;
G01L 9/0035; G01L 19/0061; G01L
9/0005; G01L 9/0041; G01L 9/0019;
G01L 9/08; G01L 9/10; G01L 21/00;
G01L 9/04; G01L 11/006; G01L 19/086;
G01L 9/00; G01L 9/0008; G01L 1/18;
G01L 11/004; G01L 19/069; G01L
9/0057; G01L 19/083; G01L 19/06; G01L
19/10; G01L 19/16; G01L 9/0016; G01L
13/023; G01L 7/048; G01L 9/0048; G01L
9/0027; G01L 9/0086; G01L 9/0079;
G01L 11/04; G01L 1/20; G01L 9/0091;
G01L 27/00; G01L 11/002; G01L 23/24;
G01L 7/182; G01L 1/02; G01L 19/0663;
G01L 7/166; G01L 23/22; G01L 9/0036;
G01L 9/0061; G01L 9/0039; G01L
23/125; G01L 19/145; G01L 9/0013;
G01L 21/04; G01L 9/0045; G01L 9/0092;
G01L 1/142; G01L 7/104; G01L 9/0033;
G01L 9/0083; G01L 9/0098; G01L
1/2293; G01L 7/24; G01L 9/02; G01L
21/22; G01L 9/0029; G01L 7/022; G01L
1/205; G01L 9/0064; G01L 23/08; G01L
5/14; G01L 13/06; G01L 23/16; G01L
7/088; G01L 7/163; G01L 9/0007; G01L
23/222; G01L 1/16; G01L 1/2287; G01L
9/0085; G01L 9/025; G01L 1/2212; G01L
21/14; G01L 9/0004; G01L 23/02; G01L
9/003; G01L 9/085; G01L 1/14; G01L
1/148; G01L 9/0058; G01L 9/105; G01L
7/02; G01L 7/061; G01L 9/002; G01L
1/2231; G01L 13/028; G01L 9/0095;
G01L 23/28; G01L 1/162; G01L 19/0076;
G01L 7/12; G01L 9/0038; G01L 9/0032;
G01L 21/10; G01L 7/024; G01L 19/149;
G01L 1/246; G01L 7/086; G01L 1/005;
G01L 5/228; G01L 7/06; G01L 1/2206;
G01L 7/102; G01L 13/021; G01L 27/02;
G01L 1/2262; G01L 1/24; G01L 1/26;
G01L 23/00; G01L 9/0094; G01L 19/144;
G01L 9/0082; G01L 1/125; G01L 9/0097;
G01L 1/2268; G01L 11/06; G01L 21/30;
G01L 21/34; G01L 23/221; G01L 7/187;
G01L 7/20; G01L 1/146; G01L 23/26;
G01L 7/068; G01L 1/144; G01L 1/225;
G01L 23/32; G01L 7/14; G01L 1/165;
G01L 23/12; G01L 1/241; G01L 13/04;
G01L 7/045; G01L 1/086; G01L 1/22;
G01L 7/108; G01L 9/18; G01L 1/127;
G01L 17/005; G01L 5/18; G01L 1/245;
G01L 21/32; G01L 1/183; G01L 1/2218;
G01L 9/0023; G01L 1/243; G01L 23/145;
G01L 5/0047; G01L 5/0076; G01L
9/0088; G01L 1/106; G01L 1/10; G01L
9/001; G01L 1/186; G01L 23/223; G01L
25/00; G01L 5/165; G01L 5/226; G01L
9/0017; G01L 1/044; G01L 3/245; G01L
9/005; G01L 1/08; G01L 21/16; G01L
3/1485; G01L 5/0038; G01L 5/162; G01L
5/225; G01L 7/026; G01L 7/065; G01L
9/0014; G01L 1/04; G01L 1/242; G01L
21/24; G01L 3/10; G01L 5/0004; G01L
5/0052; G01L 5/24; G01L 7/10; G01L
1/00; G01L 1/103; G01L 1/2275; G01L
1/247; G01L 21/02; G01L 21/26; G01L
23/225; G01L 3/102; G01L 3/105; G01L
5/223; G01L 7/028; G01L 9/0011; G01L
5/00; G01L 5/0028; G01L 5/243; G01L
1/083; G01L 1/12; G01L 21/36; G01L
23/04; G01L 23/14; G01L 23/30; G01L
3/103; G01L 5/0033; G01L 5/102; G01L
5/133; G01L 5/1627; G01L 5/166; G01L
7/185; G01L 1/255; G01L 21/08; G01L
5/0057; G01L 5/22; G01L 1/042; G01L
1/122; G01L 1/2225; G01L 1/2243; G01L
1/2256; G01L 1/248; G01L 2009/0067;
G01L 2009/0069; G01L 21/06; G01L
23/06; G01L 3/00; G01L 3/06; G01L
3/1478; G01L 3/1492; G01L 3/18; G01L
3/24; G01L 3/242; G01L 5/0061; G01L
5/08; G01L 5/10; G01L 5/101; G01L
5/108; G01L 5/16; G01L 5/161; G01L
5/167; G01L 5/28; G01L 1/046; G01L
2009/0066; G01L 2019/0053; G01L
23/085; G01L 23/20; G01L 5/0071; G01L
5/008; G01L 5/06; G01L 5/171; G01L
7/106; G05D 16/0619; G05D 7/0635;
G05D 1/042; G05D 16/202; G05D
16/163; G05D 23/12; G05D 7/0106;
G05D 16/18; G05D 16/2013; G05D
23/185; G05D 16/0663; G05D 16/20;
G05D 13/00; G05D 16/185; G05D 23/24;
G05D 7/03; G05D 16/028; G05D
16/0613; G05D 16/0655; G05D 16/10;
G05D 16/2066; G05D 7/0676; G05D
11/006; G05D 23/00; G05D 23/121;
G05D 23/19; G05D 7/00; G05D 9/12;
G05D 16/024; G05D 1/0061; G05D
1/0623; G05D 11/035; G05D 16/0404;
G05D 16/0611; G05D 16/0647; G05D
16/0661; G05D 16/0697; G05D 16/12;
G05D 16/166; G05D 23/122; G05D 23/1906; G05D 23/275; G05D 7/0193;
G05D 9/04; G05D 16/2093; G05D 3/14;
G05D 7/01; G05D 7/06; G05D 9/02;
G05D 1/0066; G05D 1/0077; G05D
1/063; G05D 1/0808; G05D 1/0816;
G05D 11/132; G05D 16/00; G05D 16/02;
G05D 16/04; G05D 16/0402; G05D
16/0622; G05D 16/0625; G05D 16/063;
G05D 16/0633; G05D 16/0641; G05D
16/0658; G05D 16/0672; G05D 16/0686;
G05D 16/0694; G05D 16/103; G05D
16/106; G05D 16/16; G05D 16/2022;
G05D 16/2026; G05D 16/2095; G05D
17/02; G05D 22/02; G05D 23/126; G05D
23/1393; G05D 23/1854; G05D 23/1919;
G05D 23/1921; G05D 23/1925; G05D
23/1931; G05D 23/1934; G05D 23/20;
G05D 23/22; G05D 23/2456; G05D
23/27537; G05D 23/2754; G05D 27/02;
G05D 3/00; G05D 3/121; G05D 3/122;
G05D 3/1418; G05D 3/1427; G05D 3/18;
G05D 7/0113; G05D 7/0126; G05D 9/00;
G05D 16/068; G05D 16/0683; G05D
16/109; G05D 16/2097; G05D 3/10
USPC .................................................... 73/700–756
See application file for complete search history.

(56) References Cited

U.S. PATENT DOCUMENTS

| | | | |
|---|---|---|---|
| 2010/0072409 A1 | 3/2010 | Hancock et al. | |
| 2018/0252436 A1* | 9/2018 | Lopez | ................. F16K 17/0486 |
| 2025/0155051 A1* | 5/2025 | Kalyanasundaram | ...................... F16K 37/005 |

FOREIGN PATENT DOCUMENTS

| | | | | |
|---|---|---|---|---|
| CN | 215257088 U | * | 12/2021 | |
| CN | 115666737 A | * | 1/2023 | ............. F16K 27/02 |
| CN | 116457597 A | * | 7/2023 | |
| GB | 2425599 A | * | 11/2006 | ............. G01L 27/00 |
| GB | 2562033 A | | 7/2018 | |
| GB | 2598239 A | * | 2/2022 | .......... G01L 27/007 |
| SU | 918621 A1 | | 4/1982 | |
| WO | 2006126951 A1 | | 11/2006 | |
| WO | 2019179667 A1 | | 9/2019 | |

OTHER PUBLICATIONS

IPO Combined Serach and Examination Report under Section 17 & 18(3), Jan. 18, 2022.
IPO Patents Act 1977 Search Report under Section 17, Jun. 22, 2021.

* cited by examiner

21

21

21

PRESSURE SENSOR AND PRESSURE RELIEF VALVE TESTING

This application is a 371 of international PCT/GB2021/053193, filed Dec. 7, 2021, which claims priority to GB Patent Application No. 2020376.6, filed on Dec. 22, 2020, the contents of each of which are hereby incorporated by reference.

The present disclosure relates to an apparatus and a method for testing of a pressure sensor, particularly a pressure sensor for measuring air pressure developed in the interior of a storage silo or the like during a filling operation, where the silo is filled with air-fluidised particulate material. The particulate material may be in the form of powder, flakes, pellets or granules and/or may be of fine particulate form. The present invention also relates to pressure relief valves, a method of testing a pressure relief valve, and a method of removing a pressure relief valve.

Storage silos (silos) are commonly used for the storage of particulate material such as cement or flour and the like. Silos are generally tall structures with a large internal volume. Typically, particulate material is delivered to silos from a road tanker or the like. The particulate material is provided into an inlet near the top of the silo, and is discharged, when needed, through an outlet at the bottom of the silo.

Silos are filled by pneumatic conveying systems. Pneumatic conveying systems air-fluidise the particulate material and blow it into the silo under a pressure of up to 200 kPa (2.0 bar). Air from the conveying process is vented from the top of the silo, through a filtering means.

Human or mechanical error may result in excess pressure building up in the silo during filling. For example, over-pressuring the pneumatic conveying system or failure of the filter may result in pressure building up in the silo. Sufficient pressure may cause damage to the silo, including rupture of the silo. For example, pressures over 7 kPa (70 mbar) inside the silo may cause damage.

It is known to provide a pressure sensor communicating with an upper internal region of the silo, to allow an operator to remotely monitor the pressure and maintain the pressure within acceptable limits during filling.

It is also known to provide a pressure relief valve in an upper part of the silo, to prevent over-pressurisation and to allow the contents of the silo to vent to atmosphere before a critical pressure is reached within the silo. The pressure relief valve is generally set to open at about 50 millibar (5 kPa). However, the mechanisms of such valves can become clogged (coil bound) or sealed shut.

Operational functionality of the pressure sensor and pressure relief valve might be regularly checked, to ensure they are working within acceptable limits. For example, an operator may check the pressure sensor and pressure relief valve before starting a fill operation. The pressure relief valve and pressure sensor are often located at inaccessible parts of the silo, above the ground.

During maintenance, the pressure relief valve may also be removed. This process can be complex and time consuming.

According to a first aspect of the invention, there is provided a pressure sensor assembly comprising: an enclosed chamber having: a first opening arranged to communicate with the interior of a container; and a second opening arranged to communicate with a pressure sensor for monitoring air pressure developed in an interior of the container; wherein the chamber defines a channel for transmission of air pressure between the first opening and the second opening and wherein a constriction is formed in the channel, the pressure sensor assembly further comprising: an air injection system adapted to inject a test pulse of air into the enclosed chamber, between the constriction and the second opening, wherein the constriction is configured to create back pressure in the enclosed chamber in response to the test pulse of air, and functional operability of the pressure sensor is verified based on the pressure measured in response to the test pulse of air.

During a filling operation, pressure is transmitted along the channel, to allow the sensor to monitor the pressure in the container. During a testing operation, the back pressure generated in the pressure sensor assembly can be used to test the pressure sensor. The inventors have realised that by generating the back pressure using a constriction, there is greater freedom in how the pressure sensor assembly couples to the interior of the container. The first opening may be freely open, or closed by a breathable membrane. Where a membrane is used, it may have high porosity to allow better transmission of pressure during normal use.

The constriction may comprise a portion of the length of the channel in which the diameter of the channel is less than the diameter of the channel either side of the constriction. The diameter of the channel may be constant within the constriction.

An end of the constriction facing the second opening may comprise a wall extending perpendicular to the direction of the channel. An end of the constriction facing the first opening may comprise a wall extending perpendicular to the direction of the channel.

The channel may have constant diameter between the constriction and the second opening.

The channel may widen between the first opening and the constriction.

Between the constriction and the first opening, the channel may have a first portion adjacent the first opening and a second portion adjacent the constriction. The first portion of the channel may have a first diameter, and the second portion of the channel may have a second diameter, smaller than the first diameter. By having a wider diameter in the first region, it may be the case that it is harder for any contamination that passes through the membrane to block the channel.

The channel may comprise a third portion adjacent the constriction, on an opposite side of the constriction to the second portion. The diameter of the third portion of the channel may be the same as second diameter.

The diameter of the first portion may be constant along its length and the diameter of the second portion may also be constant along its length.

The widening of the channel between the first opening and the constriction may comprise a step change in the diameter.

The diameter of the construction in the channel may be less than or equal to about 50% of the diameter of the enclosed chamber. For example, the diameter of the construction may be less than or equal to about 25% of the diameter of the enclosed chamber, or less than 10% of the diameter of the enclosed chamber. The diameter of the construction may be more than or equal to about 1% of the diameter of the enclosed chamber. For example, the diameter of the construction may be more than or equal to about 2% of the diameter of the enclosed chamber. The diameter of the construction may optionally be between 1 mm and 5 mm. The diameter of the enclosed chamber may be between 10 mm and 100 mm. For example, the diameter of the enclosed chamber may be between 10 mm and 40 mm. In further examples, the diameter of the enclosed chamber may be between 10 mm and 15.

The first opening of the channel may be closed by a membrane.

The air injection system may comprise a control unit arranged to control injection of the test pulse of air. The control unit may remotely located from the enclosed chamber. For example, the enclosed chamber may be located near an upper part of the container, and at least part of the control unit may be provided at ground level.

The air injection system may comprise an opening extending into the channel. The opening may extend perpendicular to the channel.

The channel may extend substantially along an axial direction between the first opening and the second opening.

According to a second aspect of the invention, there is provided a silo arranged to store particulate material, the silo comprising: an internal volume for storing particulate material; a pressure detection opening; a pressure sensor; and a pressure sensor assembly according to the first aspect received in the pressure detection opening, the first opening of the enclosed chamber of the pressure sensor assembly in communication with the pressure detection opening of the silo, and the second opening of the pressure sensor assembly in communication with the pressure sensor.

At least part of the enclosed chamber may project into the internal volume of the silo. The enclosed chamber may project into the silo by between about 50 mm and about 250 mm.

According to a third aspect of the invention, there is provided a method of testing a pressure sensor, the pressure sensor for monitoring air pressure developed in an interior of a container, the method comprising: providing an enclosed chamber forming a channel extending between a first opening arranged to communicate with the interior of the container and a second opening arranged to communicate with the pressure sensor, wherein a constriction is formed in the channel; injecting a test pulse of air into the channel between the constriction and the second opening, the test pulse arranged to generate a back pressure off the constriction; measuring the pressure at the pressure sensor; and verifying the pressure sensor based on the measured pressure.

The channel may be provided as part of the pressure sensor assembly of the first aspect. The pressure sensor assembly may be provided in the silo of the second aspect.

The test pulse of air may be controlled from a remote location.

The first opening may be closed by a membrane and the constriction may be arranged to allow transmission of pressure from the test pulse, to clean the membrane.

According to a fourth aspect of the invention, there is provided a pressure relief valve having: a valve plate arranged to open and close a pressure relief opening in a container, the valve plate having a first side arranged to face into the container and an opposing second side; biasing means to bias the plate to a closed position, the biasing means arranged such that a pressure within the container above a threshold on the first side of the valve plate causes the valve plate to move against the biasing means to an open position to release the pressure; and a telescopic cylinder arranged outside the container on the second side of the valve plate, such that actuation of the cylinder causes the valve plate to move against the biasing means to the open position, to test the operability of the valve.

The biasing means for testing the valve is located on top of the valve outside the container. This makes the mechanism easier to inspect, and less likely to become clogged by the particulate material blown out of the container when the pressure relief valve opens. Furthermore, the telescopic cylinder is a permanent part of the pressure relief valve, and no temporarily fixed apparatus is required to test the valve. The telescopic cylinder can also be operated remotely, to allow for remote testing, from ground level.

The telescopic cylinder may arranged such that contraction of the telescopic cylinder causes the valve plate to move against the biasing means to the open position.

A control unit to control actuation of the telescopic cylinder may be provided. The control unit may be remotely located from the pressure relief valve. For example, the pressure relief valve may be located near an upper part of the container, and at least part of the control unit may be provided at ground level.

The pressure relief valve may comprise a biasing plate spaced from the second side of the valve plate. The biasing means may urge the valve plate away from the biasing plate to close the container. The telescopic cylinder may extend between the valve plate and the biasing plate.

The biasing means may comprise one or more springs arranged between the valve plate and the biasing plate.

The pressure relief valve may comprise one or more connectors arranged to connect the biasing plate to a body of the container.

The one or more connectors may comprise one or more rods, each rod rigidly secured to the biasing plate and rigidly connectable to the body of the container. The valve plate may be arranged to move along the rods. The basing means may comprise springs arranged around the rods.

The telescopic cylinder may be operated by any suitable mechanism, including pneumatically, hydraulically electrically or mechanically.

According to a fifth aspect of the invention, there is provided a silo arranged to store particulate material, the silo comprising: an internal volume for storing particulate material a pressure relief opening; and a pressure relief valve according to the fourth aspect, the pressure relief valve arranged to close the pressure relief opening.

The silo may further comprise the pressure sensor assembly of the first aspect, arranged at a pressure detection opening in the silo.

The silo may comprise a seal arranged around the pressure relief opening, the valve plate arranged to close against the seal.

According to a sixth aspect of the invention, there is provided a method of testing a pressure relief valve of a silo arranged to store particulate material, the method comprising: providing a pressure relief valve having biasing means arrange to urge the valve to a closed position; providing a telescopic cylinder arranged outside the silo; actuating the cylinder to move the valve against the biasing means to the open position.

The pressure relief valve may be the pressure relief valve of the fourth aspect. The method may be performed on the silo of the fifth aspect.

According to a seventh aspect of the invention, there is provided a pressure relief valve assembly comprising: a valve plate arranged to open and close a pressure relief opening in a container, the valve plate having a first side arranged to face into the container and an opposing second side; a biasing plate spaced from the second side of the valve plate; biasing means arranged between the valve plate and biasing plate, arranged to urge the valve plate away from the biasing plate to close the container; and one or more connecting rods extending between the valve plate and the biasing plate, each rod arranged to be releasably connected to a body of the container, wherein the valve plate is arranged to move along the rods; and wherein each rod includes a stepped portion arranged to limit the movement of the valve plate.

When the rods are disconnected from the body of the container, the stepped portion of the rod retains the valve plate relative to the biasing plate and maintains the biasing means under compression between the valve plate and biasing plate. The assembly of the valve plate, biasing plate, rods and biasing means can thus be removed as a single unit. This makes removal and reconnecting the pressure relief valve simple and quick since the biasing means does not require re-calibrating.

Each rod may be rigidly secured to the biasing plate at a first end region of the connecting rod. Each rod may be arranged to be releasably connected to a body of the container at a second end region of the connecting rod, opposite the first end region.

Each connecting rod may extend through the valve plate. The stepped portion of the one or more connecting rods may be arranged on the first side of the valve plate. When then valve is connected to the body of the silo, the enlarged portion may be below the valve plate.

The one or more connecting rods may be arranged radially outside the pressure relief opening.

Each rod may comprise threaded end regions and nuts received on the threaded end regions, for securing to the biasing plate and the body of the container.

The biasing means may comprise springs arranged between the valve plate and the biasing plate. The springs may be arranged around the connecting rods.

The pressure relief valve may further include a telescopic cylinder arranged outside the container on the second side of the valve plate, between the valve plate and biasing plate, such that actuation of the cylinder causes the valve plate to move against the biasing means to open the valve, to test the operability of the valve.

The testing of the pressure relief valve may be as described in relation to any of the fourth, fifth and sixth aspects.

According to an eighth aspect of the invention, there is provided a silo arranged to store particulate material, the silo comprising: an internal volume for storing particulate material; a pressure relief opening; and a pressure relief valve according to the seventh aspect, the pressure relief valve arranged to close the pressure relief opening.

The silo may further comprise the pressure sensor assembly of the first aspect, arranged at a pressure detection opening in the silo.

The silo may comprise a cylindrical wall extending around the pressure relief opening, the valve plate arranged to sit on top of the cylindrical wall to close the pressure relief valve. The silo may comprise one or more projections extending from the outside of the cylindrical wall, the rods arranged to connect to the projections.

The silo may comprise a seal arranged on the cylindrical wall.

According to a ninth aspect of the invention, there is provided a method of removing a pressure relief valve of a container, the method comprising: providing a pressure relief valve according to the seventh aspect; disconnecting the rods from the body of the container; and removing the pressure relief valve, wherein the stepped portion of the rod maintains the springs under compression.

Unless mutually exclusive, any feature described in relation to a particular aspect may be applied mutatis mutandis to any other aspect.

Embodiments of the invention will now be described, by way of example only, with reference to the accompanying drawings in which:

FIG. 1 schematically illustrates a container in the form of a storage silo;

FIG. 2 schematically illustrates the pressure sensing system of the silo of FIG. 1, in sectional side view;

Figure 1:
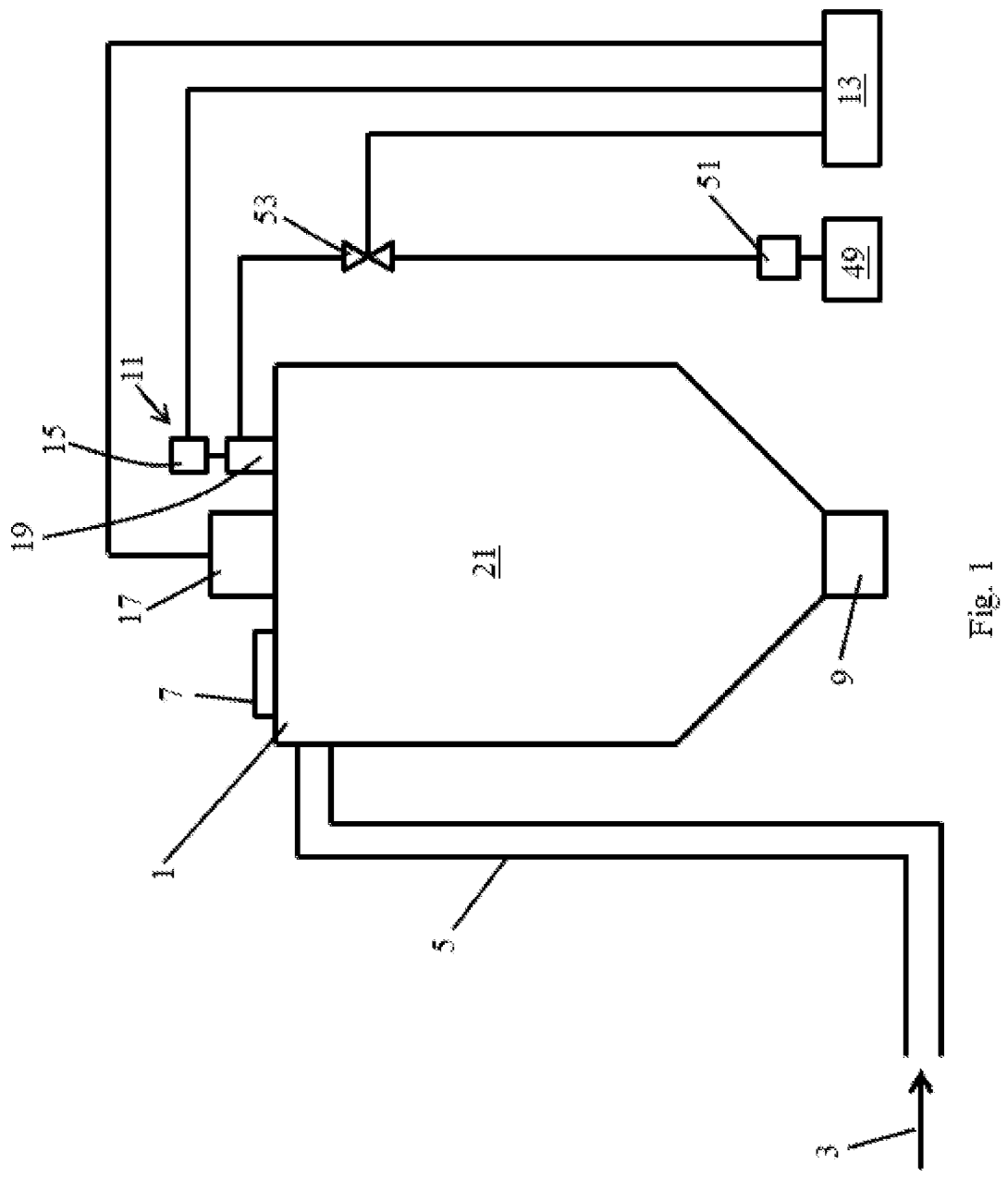

FIG. 1 shows a silo 1 for storage of particulate material 3. The silo 1 comprises a container or hopper for storing the particulate material 3. The silo 1 is typically made of steel or stainless steel. The silo 1 is filled from a road tanker or other delivery means using a pneumatic conveying system (not shown). The pneumatic delivery system air fluidises the particulate material 3 and blows it into the silo 1 under pressure, through feed pipe 5. The air used to carry the particulate material 3 during filling is vented from the top of the silo 1, such as through filtering means 7. Particulate material 3 is discharged from the silo, as required, by way of a controlled outlet 9 at a lower region of the silo 1.

A pressure sensing system 11 is provided in communication with an upper part of an interior 21 of the silo 1 to detect the pressure within the silo 1. The pressure sensing system 11 is electrically connected to a remote control unit 13, where output signals from a pressure sensor 15 in the pressure sensing system 11 are processed and a display of the sensed air pressure provided. The control unit 13 is provided at ground level to make it easily accessible to the operator involved in filling the silo 1.

If, during a filling operation, the air pressure in the silo 1 reaches or exceeds a predetermined safe limit value, appropriate preventative or remedial action can be taken by the operator. Audible and/or visual warning means may alternatively or additionally be provided for activation in such an event. The control unit 13 may be provided with processing circuitry to execute various emergency triggering or tripping functions, such as operating means, arranged to automatically prohibit charging of the silo 1 with the material 3.

A pressure relief valve 17 is also provided in an upper region of the silo 1 to allow the contents of the silo to vent to atmosphere before a critical pressure is reached within the silo 1.

As will be discussed in more detail below, the control unit 13 provides a remote test function for the pressure sensing system 11. The test function operates to indicate departure from correct functional operability of the pressure sensing system 11. Such departure from correct functional operability could result, for example, from mechanical damage, failure of a pressure responsive component or blockages in the pressure sensing system 11.

As will also be discussed below, the control unit 13 also provides for a second remote test function for the pressure relief valve 17. The second remote test function operates to indicate departure from correct functional operability of the pressure relief valve 17. Such departure from correct functional operability could result, for example, from blockages or failure of components.

Figure 2:
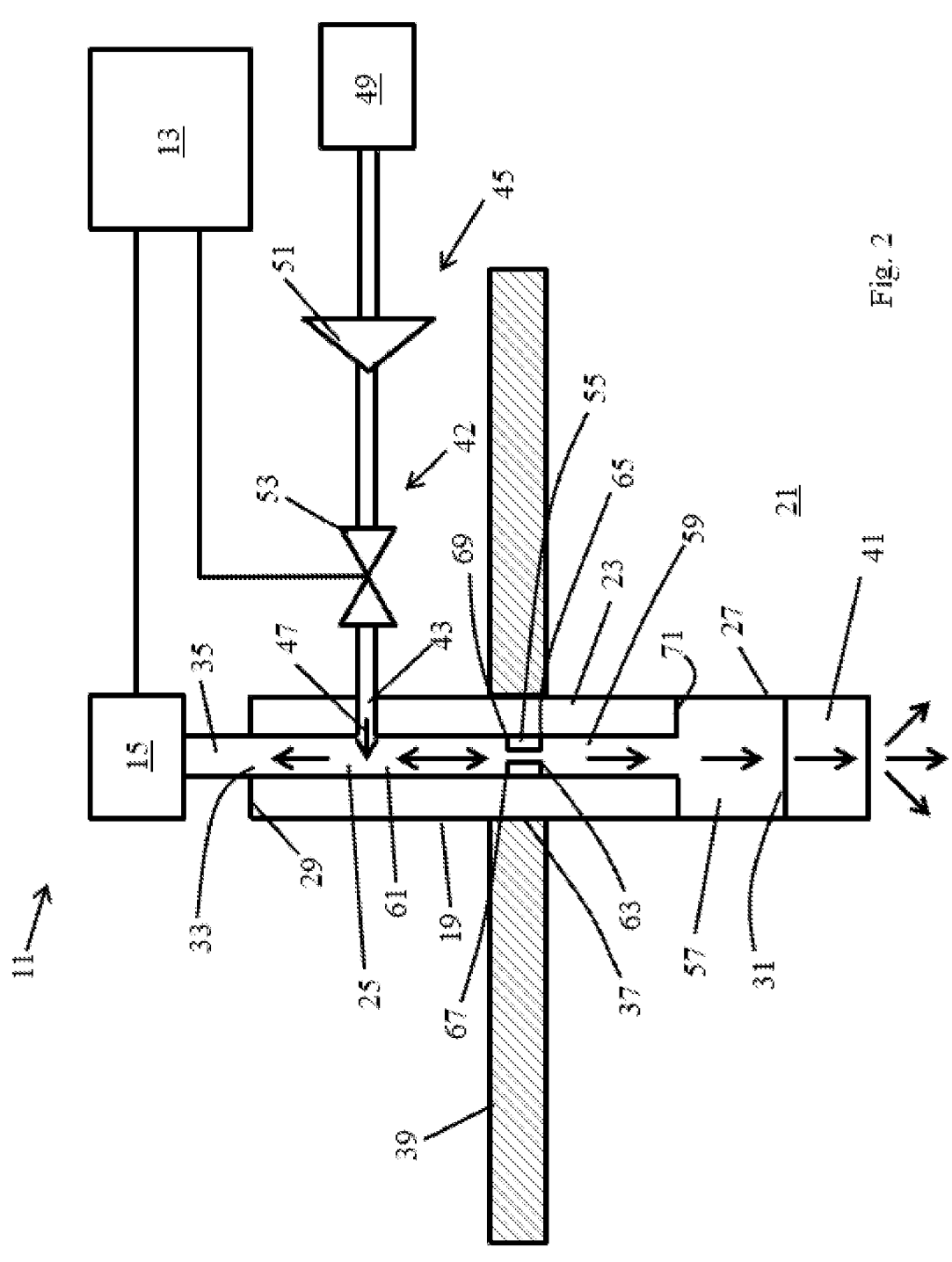

FIG. 2 illustrates the pressure sensing system 11 in more detail. The pressure sensing system 11 includes a pressure sensor assembly 19 that provides for communication of air pressure from the interior 21 of the silo 1 to the pressure sensor 15.

The pressure sensor assembly 19 comprises a body 23 defining an enclosed chamber 25 extending along an axial direction from a first end region 27 to a second end region 29. The body may be made of plastic or metal, such as aluminium or steel.

A first opening 31 into the chamber is formed at the first end region 27 of the enclosed chamber 25 and a second opening 33 is formed at the second end region 29 of the enclosed chamber 25.

The pressure sensor assembly 19 is received in a pressure detection opening 37 formed in the wall 39 of the silo 1. The first opening 31 is arranged to open into the interior 21 of the silo 1, and the second opening 33 is coupled to the pressure sensor by connecting pipes 35 or other connectors outside the silo 1. The enclosed chamber 25 thus provides a channel extending from the inside of the silo 1 to the pressure sensor 15.

The pressure sensor assembly 19 is a tight fit to the pressure detection opening and is welded or otherwise sealingly fitted into place so that the only path for transmission of air from the silo 1 to the pressure sensor 15 is through the enclosed chamber 25. Furthermore, the pressure sensor assembly 19 extends away from the wall 39 of the silo 1, such that the first opening 31 is spaced from the wall 39 and clear of any debris or other matter accumulated at the wall.

The channel may have a length of between 50 mm and 250 mm. The first end region 27 of the pressure sensor assembly may project into the silo 1 by between 5 mm and 250 mm. In some examples, the first end region 27 of the pressure sensor assembly may project into the silo 1 by between 50 mm and 150 mm.

The first opening 31 of the enclosed chamber 25 is closed by a breathable membrane 41. The membrane 41 is arranged to permit two-way air flow through it, between the interior 21 of the silo 1 and the enclosed chamber 25 at a predetermined flow rate, while substantially preventing or reducing transfer of the particulate material 3 across the membrane 41 when the particulate material 3 is being blown into the silo 1.

The membrane 41 may have pores having a size of from about 20 microns to about 250 microns and optionally of from about 100 microns to about 250 microns. The membrane 41 has a thickness of from about 0.5 mm to about 50 mm. The first opening 31 may extend the full diameter of the enclosed chamber 25, in which case, the diameter of the membrane 41 may be the same as the enclosed chamber 25. Alternatively, the enclosed chamber 25 may include an end wall with a smaller opening formed in it, in which case, the membrane 41 should cover the opening 31.

In one example, the membrane 41 may comprise a disc of sintered high density polyethylene material. The thickness of the membrane 41 in the particular example may be about 4.5 mm, with an average pore size of at least 100 microns and a maximum pore size of about 150 microns. Such a disc of the polyethylene material suitably has an apparent density of about 0.47 g/cm 3 and an air permeability of from about 6.1 to about 7.9 m 3 imin/m 2 (measured at a pressure difference of about 0.1 mbar). A suitable porous polyethylene material is available from SPC Technologies under Product Code No. SP-049.

The membrane 41 may be fitted to a mounting ring, which in turn is fixed to the body 23 in any suitable way, such as adhesive, screwing, or other mechanical fixing. Alternatively, the membrane 41 may be fixed directly to the body 23. The membrane may be removable to enable replacement of the membrane during maintenance.

The pressure sensor assembly 19 also includes an air injection system 42. The air injection system 42 includes an opening 43 extending through the side of the body, into the enclosed chamber 23 between the first opening 31 and the second opening 43. As shown in FIG. 2, the air injection opening 43 is provided on the outside of the silo 1, between the silo wall 39 and the second opening 33.

The air injection system 42 also includes an air supply 45, to supply a pulse of air 47 into the enclosed chamber 23, through the air injection opening 43. The air supply 45 includes a compressed air source 49 and a regulator 51 to control the pressure of the air pulse 45. A valve 53 is also provided to control the injection of the pulse 45. The valve 53 is remotely controlled from the control unit 13.

The valve 53 may be an electrically controlled solenoid valve, preferably of normally closed form, which may be provided adjacent to or incorporated with the enclosed chamber 23.

The channel formed by the enclosed chamber 23 includes a constriction 55 provided between the first opening 31 and the air injection opening 43. The air injection opening 43 is thus between the constriction 55 and the second opening 33. The constriction 55 comprises a region of the enclosed chamber 23 where the diameter of the channel is reduced. The constriction 55 may form up to half of the overall length of the enclosed chamber 23.

As shown in FIG. 2, in series between the first opening 31 and the second opening 33, the channel or enclosed chamber 23 includes a first portion 57, a second portion 59 and a third portion 61.

The first portion 57 is adjacent the first opening 31 and membrane 41, the second portion 59 extends between the first portion 57 and the constriction 55 and the third portion extends from the constriction 55 to the second opening 33. The air injection opening 43 opens in to the third portion 61.

The first portion 57 of the channel has the widest diameter, where the channel is substantially the same diameter as the body 23 of the enclosed chamber. The diameter of the channel is then reduced in the second and third portions 59, 61, and further reduced within the constriction 55. The diameter of the channel in the second portion 59 is the same as in the third portion 61. The diameter of the channel within each of the portions 57, 59, 61 and within the constriction 55 is constant.

At the points along the length of the channel (from the first opening 31 to the second opening 33) where the diameter changes, the change is a step change. Therefore, at a first end region 63 of the constriction 55, facing the first opening 31, a first end wall 65 is formed, extending perpendicular to the direction of the channel and having an opening into the constriction 55. Likewise, at a second end region 67 of the constriction, opposite the first end region 63 and facing the second opening 33, a second end region wall 69 is formed, extending perpendicular to the direction of the channel and having an opening into the constriction 55.

In a similar fashion, a further perpendicular wall 71 is formed at the change between the diameter of the first portion 57 and the diameter of the second portion 59. The further end wall 71 includes an opening extending into the second portion 59.

During filling of the silo 1, the valve 53 is closed. While the particulate material 3 is blown into the silo 1, air pressure building up in the silo 1 also builds up in the enclosed chamber 23 by transmission of air across the membrane 41. This is transmitted along the channel and is sensed by the pressure sensor 15. Output signals from the pressure sensor 15 are transmitted to the remote control unit 13 where they are processed and an indication of the sensed pressure provided.

During testing of the pressure sensor 15, the valve 53 is opened to admit a pulse of air 47 into the enclosed chamber 23. The arrows shown in FIG. 1 indicate the passage of a test air pulse 47. The constriction 55 results in a back pressure from the air pulse 47, which is sensed at the pressure sensor 15.

It will be appreciated that during both testing and normal operation, the pressure sensor assembly will attenuate the actual pressure generated. For example, the test pulse of air may have a pressure of between 20 kPa to 70 kPa (200 mabr to 700 mbar). If the pressure sensor 15 and pressure sensing system 11 are functioning correctly, the pressure sensor 15 may indicate a pressure of about 10% of the pulse pressure. The pressure sensor 15 may have an pressure sending range of up to around 10 kPa (100 mbar) By varying the pressure of the test pulse of air, the pressure sensor may be tested over its full range of operation.

The proper functioning of the pressure sensing system 11 may be indicated by a detecting a pressure within a range determined by the test pulse of air 47. Air pressure outside the range (either above or below) may indicate various sources of failure, such as failure of the pressure sensor 15, blockage of the channel or membrane 41 in the pressure sensor assembly 19, or other possible failures.

Air pressure from the test pulse of air 47 may also be transmitted through the constriction 55. Therefore, the test pulse of air 47 will also serve to purge accumulated particulate material 3 from the membrane 41 and will therefore, at least to some extent, serve to clean and maintain the membrane 41 free of blockage. It will be appreciated that the membrane 41 as is sufficiently porous and thin that no or negligible back pressure is created from the membrane 41 in the region between the first opening 31 and the constriction 55.

The pressure sensor assembly 19 provides for air communication between the interior 21 of the silo 1 and the pressure sensor 15. It will be appreciated that the embodiment discussed above is by way of example only. Any suitable channel extending from an opening 31 into the silo 1 and an opening 33 connected to a pressure sensor 15 may be provided and any suitable constriction 55 may be used to generate a back pressure.

For example, whilst the channel shown in FIG. 2 is straight, such that it extends substantially along an axis extending form the first opening 31 to the second opening 33, the channel may follow any path. The channel and constriction may also have any suitable diameter and length.

By way of further example whilst the example above has a channel including three portions, the channel may have more or fewer portions. Each portion may have a constant diameter or a varying diameter, and the change of diameter between portions may be a step change or a gradual change.

In the example discussed above, the channel is the same diameter either side of the constriction 55, but this does not necessarily need to be the case.

The constriction may be provided at any suitable position between the air injection opening 43 and the first opening 31. In the example shown, the constriction is aligned with the wall 39 of the silo 1, but this does not necessarily need to be the case.

The air injection opening 43 may be provided at any suitable position between the constriction 55 and the second opening. The air injection opening 43 may be provided outside the silo 1 to provide easy access, but this need not necessarily be the case.

Any suitable supply system may be used to generate the pulse of air 47.

Instead of providing separate openings 33, 43 in the enclosed chamber 23 for connection to the pressure sensor 15 and the injection of the test pulse of air, a single communication port could be provided in the enclosed chamber 23 and connected by way of a T-piece to the pressure sensor 15 and the air supply. The single communication port thus forms both the second opening 33 in the chamber 23 and the air injection opening 43.

The pressure sensor may be integrated into the pressure sensor assembly 19 rather than being separate.

In the example shown, a membrane 41 is provided to prevent ingress of particulate material into the enclosed chamber 43. Any suitable air porous element or valve may be used. Furthermore, in some embodiments, the membrane 41 may be omitted.

Figure 3:
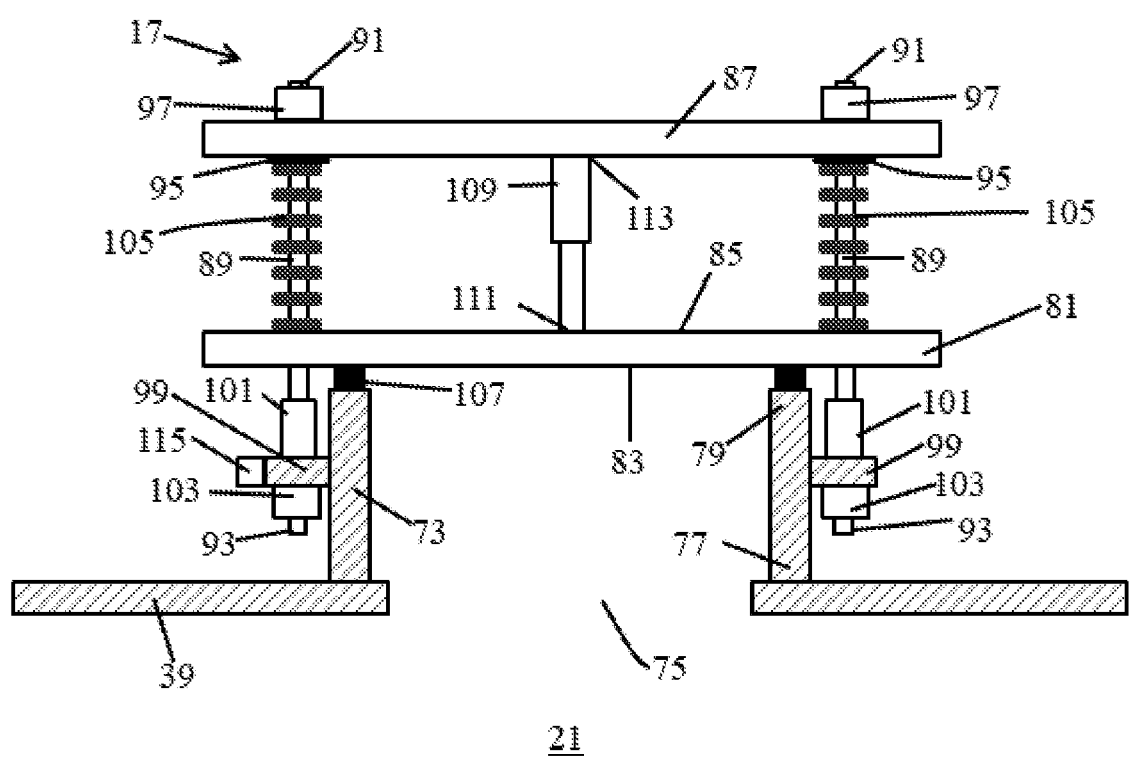
FIG. 3 shows a pressure relief valve according to an embodiment of the invention, in the closed position.

FIG. 3 shows the pressure relief valve 17 in more detail. The pressure relief valve 17 includes a cylindrical wall 73 extending around an opening 75 in the wall 39 of the silo 1. The cylindrical wall 73 extends from a lower end region 77 adjacent the silo 1 to an opposing upper end region 79 away from the silo 1.

At the lower end region 77, the cylindrical wall 73 may be attached to the wall 39 of the silo 1 in any suitable way, for example, by rivets, nuts and bolts or welding. The cylindrical wall 39 may include a outwardly extending flange at its base (not shown) to enable attachment to the wall 39 of the silo 1. Alternatively, the silo 1 may include an upstanding cylindrical wall (not shown) and the cylindrical wall 73 of the pressure relief valve 17 may be connected to the upstanding wall of the silo 1 at outwardly extending flanges.

A valve plate 81 is provided on top of the cylindrical wall 73. The valve plate 81 has a diameter greater than the cylindrical wall 73, a first side 83 facing into the silo 1 and an opposing second side 85 facing away from the silo 1.

A biasing plate 87 is spaced from the second side 85 of the valve plate 81. Axially extending rods 89 are secured to the biasing plate 87 at first end regions 91 of the rods 89. The rods 89 are rigidly secured to the biasing plate 87, such that there is no relative movement of the biasing plate 87, silo 1 and rods 89.

In one example, the rods 89 may include a radially extending projection 95 near the first end regions 91 of the rods to locate the biasing plate 87. The first end regions 91 of the rods 89 may also be threaded. The rods 89 can thus be secured to the biasing plate 87 by providing and tightening bolts 97 onto the threaded end regions 91, so that the biasing plate 87 is secured between the projection 95 and the nut 97. In alternative examples, the rods 89 may be secured between two nuts 97, or may be secured by other suitable engaging projections or welding or other means.

The rods 89 extend in an axial direction from the biasing plate 87, towards the valve plate 81. The rods 89 extend through openings (not shown) in the valve plate 81, and extend below the first side 83 of the valve plate 81.

At second end regions 93 of the rods 89, the rods 89 extends through holes (not shown) in a flange or projections 99 extending from the cylindrical side wall 73 of the pressure relief valve 17. The flange or projection 99 may be continuous around the cylindrical wall 73, or discontinuous.

The rods are provided with enlarged or stepped portions 101 having diameter enlarged diameter greater than the holes in the valve plate 81 and the flange 99 through which the rod 89 extends. The enlarged portions 101 therefore locate the rods 87 on top of the flange 99. The enlarged section is spaced below the valve plate 81 and the second end region 79 of the cylindrical wall when the valve plate 81 is in the closed position. Therefore, the enlarged portion does not engage the valve plate 81.

The second end regions 93 of the rods 89 are threaded, such that the second end regions 93 of the rods 89 can be secured by nuts 103 to the cylindrical wall 73 of the pressure relief valve 17.

In the above arrangement, the rods 89 and biasing plate 87 are rigidly secured to cylindrical wall 73 of the pressure relief valve 17. Therefore, there is no relative movement between the biasing plate 87, rods 89 and silo 1. However, the valve plate 81 is able to move in an axial direction towards and away from the biasing plate 81 along the rods 89.

Biasing means are provided which act between the valve plate 81 and biasing plate 87 to urge the valve plate 81 away from the biasing plate 87 and to a closed positon, in which the valve plate 81 sits on the top 79 of the cylindrical wall 73. In the example shown the biasing means comprise coil springs 105. Each rod 89 passes through the centre of one of the coils springs 105. Each coil spring 105 may be housed in a rubber boot or similar cover (not shown).

In normal use, the coil springs 105 urge the valve plate 81 down onto a seal 107 provided at the top of the cylindrical wall 73 of the pressure relief valve 17.

Figure 4:
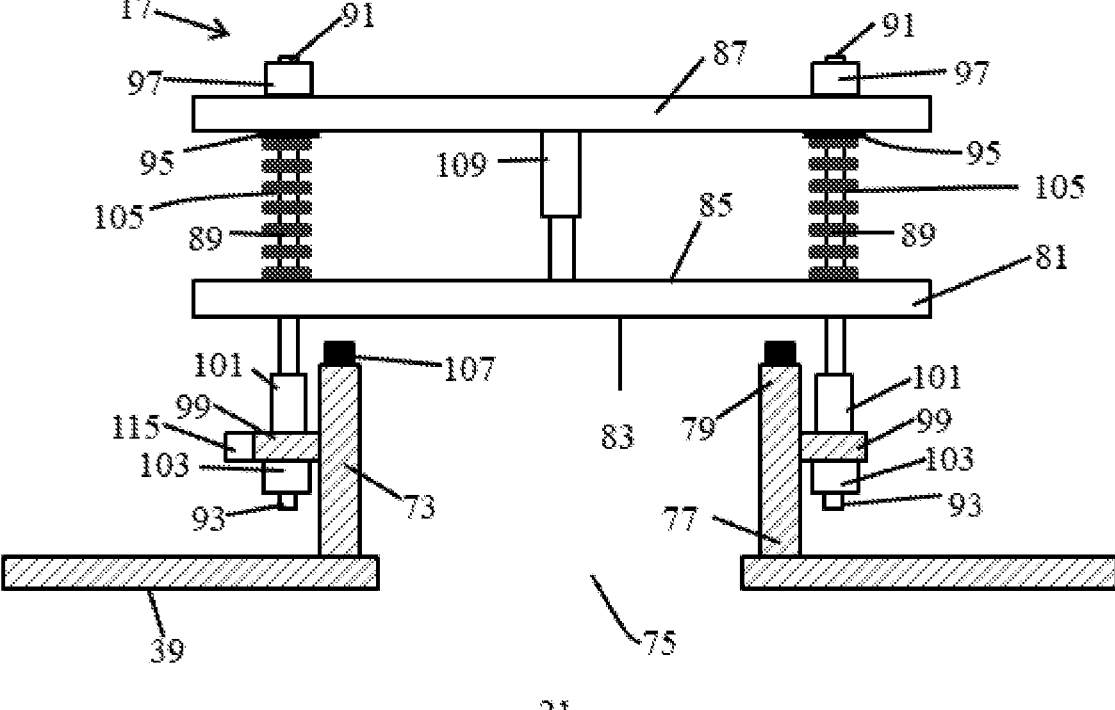
FIG. 4 shows the pressure relief valve of FIG. 3 in the open position.

Sufficient air pressure building up inside the silo 1 allows the valve plate 81 to move against the coil springs 105, away from the seal 107 so as to open the valve 17. The valve 17 closes again once there is no longer an excess pressure within the silo. In one example, the pressure relief valve should open at any pressure over 5 kPa (50 millibar). For a typical valve plate 87 having a diameter of about 350 mm this corresponds to a load of about 50 kg to lift the valve plate 81 and open the valve. FIG. 4 shows the valve 17 in an open position.

The valve plate 81, biasing plate 87 and coil springs 105 may optionally be provided with a cover (not shown). The cover comprises a generally flat plate provided with a circumferential skirt which covers at least part of the side of the valve 17. The cover may be secured in place by any suitable means, for example the rods 89 may extend through the cover and additional nuts may hold the cover in place. Alternatively, separate attachment means may be provided at any suitable positon.

FIG. 3 shows a telescopic cylinder 109 extending between the valve plate 81 and the biasing plate 87. At a first end region 111, the telescopic cylinder 109 is secured to the valve plate 81 and at a second end region 113, opposite the first end region 111, the telescopic cylinder 109 is secured to the biasing plate 87.

The telescopic cylinder 109 may be secured to the valve plate 81 and biasing plate 87 by any suitable fixing (not shown). For example, the end regions 111, 113 may be secured by rivets, bolts, welding, adhesive or any other suitable means.

The telescopic cylinder 109 comprises a number of separate cylindrical portions of gradually increasing diameter nested inside each other. The outermost cylinder forms a first end region of the cylinder, and the inner most cylinder forms the second end region. By sliding the cylinders in and out of each other, the length of the cylinder can be contracted or extended. In the example shown, the telescopic cylinder 109 is a double acting cylinder 109, although a single acting cylinder may also be used. In yet another example a pair of single acting cylinders working in opposite directions may be used.

Contraction and extension of the cylinder 109 can be driven by any suitable driver such as hydraulics, pneumatics and electrics. For a hydraulic or pneumatic cylinder, supply of air or oil respectively from a suitable sump or source is controlled by a valve, pump or compressor (not shown), which in turn is controlled by the control unit 13. When using a compressed air cylinder 109, the air supply 45 used to generate the test pulse of air 47 may also be used to operate the cylinder 109, but an alternative source may also be used. For an electric cylinder, the control unit 13 directly controls the cylinder.

During normal use, pressure is removed from the telescopic cylinder 109. Therefore, the cylinder provides no resistance against lifting of the valve plate 81 in the event of an over pressure.

Alternatively, the telescopic cylinder 109 may provide some resistance. In such examples, the force exerted by the coil springs 105 is reduced so that the total force acting against the valve plate 81 is as discussed above.

To test the function of the pressure relief valve 17, the telescopic cylinder 109 is actuated to contract. This lifts the valve plate 81 off the seal 107, to open the valve. A proximity sensor 115 detects when the pressure relief valve 17 is open. In the example shown, the proximity sensor 115 is shown on the projection 99. However, the proximity sensor 115 can be provided in any suitable position, for example, inside the silo 1 or outside the silo 1.

The force required to retract the cylinder 109 to open the pressure relief valve 17 is monitored. Where the pressure relief valve 17 is properly functioning, the force applied by the cylinder 109 to open the pressure relief valve 17 is comparable to the overpressure required to open the valve. If the valve plate 81 lifts with too low or too high a force, or does not lift, this suggests failure of the valve.

Failure of the valve 17 may result from build-up of material around the valve plate 81 or the coil spring 105, or of failure of the components of the valve 17.

From time to time, it may be necessary to remove the pressure relief valve 17 to allow inspection of the interior 21 of the silo 1.

Figure 5:
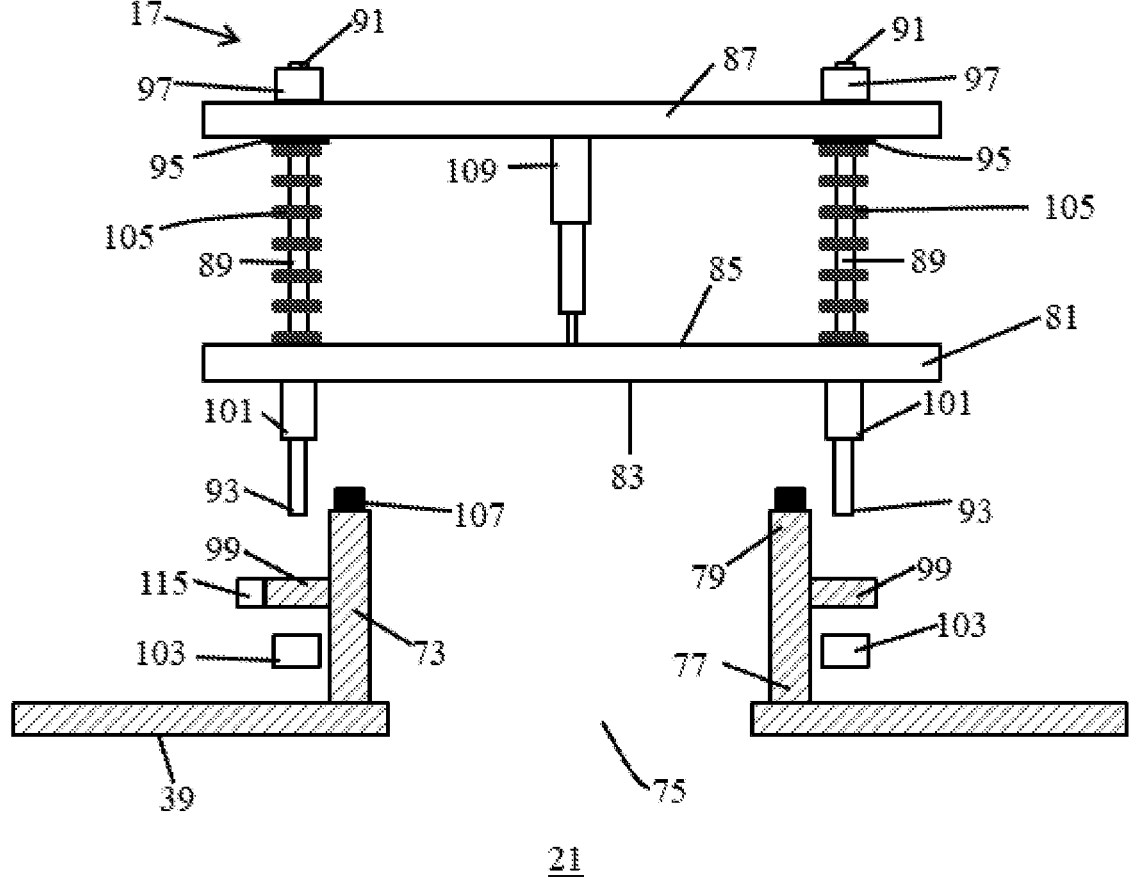
FIG. 5 shows the pressure relief valve of FIG. 3 disconnected from the silo for maintenance.

In order to remove the pressure relief valve shown in FIG. 3, the nuts 103 at the second end regions 93 of the rods 89 can simply be removed. As shown in FIG. 5, this allows the assembly of the rods 89, valve plate 81, biasing plate 87 and springs 105 to be removed as a single unit. When the valve plate 81 is removed in this way, the springs 105 continue to urge the valve plate 81 away from the biasing plate 87. However, the enlarged portion 101 of the rods acts as a stop for the valve plate 81 to retain the valve plate 81 relative to the biasing plate 87. Therefore the springs are retained under at least partial compression when the pressure relief valve 17 is removed.

During removal of the valve plate, the pressure may be removed from the cylinder 109, to allow the cylinder to be free to extend. Alternatively, the cylinder 109 may actuated to extend.

In order to refit the pressure relief valve, the rods are simply rethreaded through the projection 99, and the nuts retightened 93. Again, the cylinder 109 is actuated to retract or the pressure is removed so the cylinder 109 is free to retract. Therefore, reconnecting the valve plate 81 causes the coil springs 105 to revert to the correct compression without having to recalibrate or re-tension the springs 105.

In the example shown, two rods 89 are shown in the pressure relief valve 17. It will be appreciated that any number of rods 89 may be provided. For example, there may be three rods 89 evenly spaced around the pressure relief valve, or more rods or fewer rods. The rods may be threaded at only the end regions or along their full length.

Whilst the biasing means in the example discussed above comprises coil springs 105, any suitable resiliently biased member (or members) that urge the valve plate 81 shut, but allows the valve plate 81 to be opened from sufficient force beneath may be used.

In the example discussed above, the coil springs 105 are arranged around the rods 89 used to connect the valve plate 81 and biasing plate 87 to the silo 1. However, this need not be the case. The coil springs 105 or other biasing members may be provided separately to the connecting rods 89.

In the example discussed above, the biasing plate 87 is arranged above the valve plate 81, and the coil springs 105 (or other biasing member) urges the valve plate 81 away from the biasing plate 87. In other examples, the biasing plate 87 may be arranged around the outside of the opening 75 and below the valve plate 81, and the coil springs (or other biasing means) may pull the valve plate 81 towards the biasing plate 87. In this example, the telescopic cylinder 109 may be provided above the valve plate 81 and arranged to lift the valve plate from above (the cylinder may extend between the valve plate 81 and a further station plate spaced above the valve plate 81) or the cylinder 109 may be provided radially outside the cylindrical wall 73, and arranged to push the valve plate 81 from below by extending.

In the example shown, only a single telescopic cylinder 109 is provided, but there may be any number of telescopic cylinder 109 working parallel. The telescopic cylinder 109 shown in the figures has three sections, each provided by separate tubes. It will, however, be appreciated that the telescopic cylinder 109 may have any number of sections.

The testing of the pressure relief valve 17 discussed above is by way of example only. The telescopic cylinder 109 may be omitted and other methods may be used to test the valve. Alternatively, a pressure relief valve using a telescopic cylinder to test the valve may be disconnected and reconnected from the silo 1 any way.

A silo incorporating the pressure relief valve 17 discussed above may optionally include the pressure sensing system 11 discussed in relation to FIG. 2 or may include any other pressure sensing system 11. Conversely a silo 1 including the pressure sensing system 11 discussed above may include the pressure relief valve 17 discussed above, or any other pressure relief valve.

Where provided, the pressure relief valve 17 and pressure sensing system 11 may be provided at any suitable position on the silo 1. In FIG. 1, the pressure relief valve 17 and pressure sensing system 11 are provided in the top of the silo 1, but they may be located in the sides, either near the top or lower down.

Where the silo 1 provides methods for testing the pressure sensor 15 and pressure relief valve 17, an operator may conduct tests before filling the silo 1 and/or on a regular basis. Having verified functional operability of the pressure sensor 15, confirmed that the porous element 22 is not blocked and confirmed the functional operability of the pressure relief valve 17, the operator can then safely proceed to charge the silo 1 with the particulate material 3.

Any suitable control unit 13 may be used. In the embodiment discussed above, a single control unit 13 operates the testing of the pressure relief valve 17 and the pressure sensor

14

15. However, this need not be the case. Furthermore, function of the control unit may be distributed amongst a number of units with only a user interface portion at ground level near the silo 1. The control unit 13 may communicate with the pressure relief valve 17 and pressure sensing system by any suitable wired or wireless communications protocol.

The invention claimed is:

1. A pressure sensor assembly comprising:
an enclosed chamber having:
    a first opening arranged to communicate with the interior of a container; and
    a second opening arranged to communicate with a pressure sensor for monitoring air pressure developed in an interior of the container;
    wherein the chamber defines a channel for transmission of pressure between the first opening and the second opening and wherein a constriction is formed in the channel,
the pressure sensor assembly further comprising:
    an air injection system adapted to inject a test pulse of air into the enclosed chamber, between the constriction and the second opening, wherein the constriction is configured to create back pressure in the enclosed chamber in response to the test pulse of air, and functional operability of the pressure sensor is verified based on the pressure measured in response to the test pulse of air.

2. The pressure sensor assembly of claim 1, wherein the diameter of the channel is constant within the constriction and/or wherein the channel has constant diameter between the constriction and the second opening.

3. The pressure sensor assembly of claim 1, wherein:
an end of the constriction facing the second opening comprises a wall extending perpendicular to the direction of the channel; and
an end of the constriction facing the first opening comprises a wall extending perpendicular to the direction of the channel.

4. The pressure sensor assembly of any claim 1, wherein the channel widens between the first opening and the constriction.

5. The pressure sensor assembly of claim 4, wherein, between the constriction and the first opening, the channel has a first portion adjacent the first opening and a second portion adjacent the constriction, wherein the first portion of the channel has a first diameter, and the second portion of the channel has a second diameter, smaller than the first diameter.

6. The pressure sensor assembly of claim 5, wherein the channel comprises a third portion adjacent the constriction, on an opposite side of the constriction to the second portion, wherein the diameter of the third portion of the channel is the same as the second diameter.

7. The pressure sensor assembly of claim 5, wherein the diameter of the first portion is constant along its length and the diameter of the second portion is constant along its length.

8. The pressure sensor assembly of claim 5, wherein the widening of the channel between the first opening and the constriction comprises a step change in the diameter.

9. The pressure sensor assembly of claim 1, wherein the first opening of the channel is closed by a membrane.

10. The pressure sensor assembly of claim 1, wherein the air injection system comprises a control unit arranged to control injection of the test pulse of air, and wherein the control unit is remotely located from the enclosed chamber.

11. The pressure sensor assembly of claim 1, wherein the air injection system comprises an opening extending into the channel.

12. The pressure sensor assembly of claim 1, wherein the channel extends along an axial direction between the first opening and the second opening.

\* \* \* \* \*